(12) United States Patent
Simone et al.

(10) Patent No.: US 9,356,357 B2
(45) Date of Patent: *May 31, 2016

(54) METHODS AND COMPOSITIONS FOR DESTRUCTIVE INTERFERENCE

(71) Applicant: SABIC Global Technologies B.V., Bergen op Zoom (NL)

(72) Inventors: Davide Louis Simone, Saratoga Springs, NY (US); Gary Stephen Balch, Ballston Spa, NY (US); David Alexander Gibson, III, Scotia, NY (US); Harold Jay Patchen, Ballston Lake, NY (US); Allen Lawrence Garner, Clifton Park, NY (US); Gregory John Parker, San Jose, CA (US); Daniel Qi Tan, Rexford, NY (US); Francis Johnson, Clifton Park, NY (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 310 days.

This patent is subject to a terminal disclaimer.

(21) Appl. No.: 13/739,540

(22) Filed: Jan. 11, 2013

(65) Prior Publication Data

US 2014/0197977 A1   Jul. 17, 2014

(51) Int. Cl.
*H01Q 15/14* (2006.01)
*C08K 3/04* (2006.01)
*C08K 3/08* (2006.01)
(Continued)

(52) U.S. Cl.
CPC  *H01Q 15/14* (2013.01); *C08K 3/04* (2013.01); *C08K 3/08* (2013.01); *C08K 7/24* (2013.01); *C08L 55/02* (2013.01); *C08L 65/00* (2013.01); *H01B 1/22* (2013.01); *H01B 3/004* (2013.01);

(Continued)

(58) Field of Classification Search
CPC ........... C08L 55/02; C08L 65/00; C08K 3/04; C08K 3/08; C08K 7/24; H01Q 15/14; H01Q 17/002
USPC .............................................................. 342/5
See application file for complete search history.

(56) References Cited

U.S. PATENT DOCUMENTS 5,183,591 A   2/1993  Akahoshi et al.
5,578,359 A   11/1996 Forbes
(Continued)

FOREIGN PATENT DOCUMENTS

EP           0176866 A2    4/1986
WO   WO 2010/109174 A1    9/2010
WO   WO 2014/061048 A2    4/2014

OTHER PUBLICATIONS

Huang, et al. (1985) Electromagnetic shielding properties of amorphous alloy shields for cathode ray tubes. J. Appl. Phys., 57(1): 3517-3519.

(Continued)

*Primary Examiner* — Timothy A Brainard
(74) *Attorney, Agent, or Firm* — Baker Hostetler LLP

(57) ABSTRACT

A composition for destructive interference in at least a portion of the frequency range from about 1 GHz to about 20 GHz can comprise a dielectric and a conductive filler mixed with at least a portion of the dielectric, wherein the percentage volume of the conductive filler relative to the total volume of the composition is configured such that the wavelength of sensitivity for the composition is on the order of a wavelength of an incident electromagnetic radiation in at least a portion of the frequency range from about 1 GHz to about 20 GHz.

25 Claims, 10 Drawing Sheets

(51) Int. Cl.
*C08K 7/24* (2006.01)
*C08L 55/02* (2006.01)
*H01Q 17/00* (2006.01)
*C08L 65/00* (2006.01)
*H01B 1/22* (2006.01)
*H01B 3/00* (2006.01)

(52) U.S. Cl.
CPC ...... *H01Q 17/002* (2013.01); *C08G 2261/3221* (2013.01); *C08G 2261/51* (2013.01)

(56) References Cited

U.S. PATENT DOCUMENTS

| | | | | |
|---|---|---|---|---|
| 5,642,118 | A * | 6/1997 | Grannemann | H01Q 17/00 342/4 |
| 5,952,953 | A * | 9/1999 | Nikawa | H01Q 17/004 342/1 |
| 7,612,138 | B2 | 11/2009 | Kuznetsov | |
| 8,610,617 | B1 * | 12/2013 | Avouris | H01Q 17/00 342/13 |
| 2003/0146866 | A1 * | 8/2003 | Hayashi | H01Q 17/008 342/1 |
| 2004/0021597 | A1 * | 2/2004 | Dvorak | H01Q 17/008 342/1 |
| 2006/0241236 | A1 | 10/2006 | Kuznetsov | |
| 2009/0096106 | A1 * | 4/2009 | Vrtis | C23C 16/30 257/759 |
| 2009/0135042 | A1 | 5/2009 | Umishita | |
| 2010/0096181 | A1 | 4/2010 | Nakamura | |
| 2010/0149078 | A1 | 6/2010 | Kim | |
| 2010/0182188 | A1 * | 7/2010 | Kudo | D04H 1/005 342/4 |
| 2011/0178224 | A1 | 7/2011 | Pan | |
| 2011/0260904 | A1 * | 10/2011 | Fukuda et al. | 342/1 |

OTHER PUBLICATIONS

Metglas Magnetic Alloy 2705M (cobalt based) Technical Bulletin. Ref: 2705M03092009.

* cited by examiner

METHODS AND COMPOSITIONS FOR DESTRUCTIVE INTERFERENCE

BACKGROUND

The principle of superposition of waves states that when two or more waves are incident on the same point, the total displacement at that point is equal to the vector sum of the displacements of the individual waves. For example, if a crest of a wave meets a crest of another wave of the same frequency at the same point, then the magnitude of the displacement is the sum of the individual magnitudes—this is constructive interference. If a crest of one wave meets a trough of another wave then the magnitude of the displacements is equal to the difference in the individual magnitudes—this is known as destructive interference. It would be desirable to develop compositions and methods for facilitating destructive interference of electromagnetic (EM) waves.

SUMMARY

It is to be understood that both the following general description and the following detailed description are exemplary and explanatory only and are not restrictive, as claimed. Provided are methods and compositions for facilitating destructive interference of electromagnetic waves. In an aspect, the methods and compositions of the present disclosure facilitate destructive interference in at least a portion of the frequency range from about 1 GHz to about 20 GHz.

The problem involves providing a composition with absorptive properties. In an aspect, methods and compositions can comprise conductive fillers. As an example, the conductive fillers can be lossy fillers. In another aspect, one or more compositions can comprise selective surface shaping.

In an aspect, provided are compositions comprising properties such as real permittivity and permeability that facilitate destructive interference of EM waves. As an example, a thickness of one or more composition can be provided such that half an EM wave entering the composition is met by an equal but opposite (out-of-phase) half-wave reflecting from the composition structure. As a further example, such interference phenomena yield high degrees of absorption and low reflection at the specific wavelengths that undergo the destructive interference. In an aspect, since specific values of real permittivity and permeability can yield this desired interference phenomena, the filler type and loading level of the filler in the compositions can be selected to facilitate such interference phenomena.

In an aspect, differing compositions that exhibit the destructive interference phenomena at different wavelength can be stacked into multilayers yielding a composition structure that yields greater broadband absorption and decreased transmission relative to a single-layer composition.

In an aspect, a composition for destructive interference, in at least a portion of the frequency range from about 1 GHz to about 20 GHz, can comprise a dielectric and conductive filler. As an example, the conductive filler can be mixed with at least a portion of the dielectric, wherein the percentage volume of the conductive filler relative to the total volume of the composition is configured such that the wavelength of sensitivity for the composition is on the order of a wavelength of an incident electromagnetic radiation in at least a portion of the frequency range from about 1 GHz to about 20 GHz.

In an aspect, a method of increasing destructive interference in at least a portion of the frequency range from about 1 GHz to about 20 GHz can comprise providing a composition and receiving, at the composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

In an aspect, a composition for destructive interference in at least a portion of the frequency range of from about 1 GHz to about 20 GHz can comprise a dielectric and conductive filler mixed with at least a portion of the dielectric. As an example, the thickness of the composition measured from an incident surface is on the order of a wavelength of sensitivity of the composition in at least a portion of the frequency range from about 1 GHz to about 20 GHz.

In an aspect, a composition for destructive interference in at least a portion of the frequency range from about 1 GHz to about 20 GHz can comprise a dielectric and conductive filler mixed with at least a portion of the dielectric. As an example, the percentage volume of the conductive filler relative to the total volume of the composition is configured such that a reflective wave of electromagnetic radiation is generated in response to receiving an incident wave of electromagnetic radiation, the reflective wave having a wavelength on the order of a wavelength of the incident wave of electromagnetic radiation.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and compositions.

DETAILED DESCRIPTION

Figure 1:
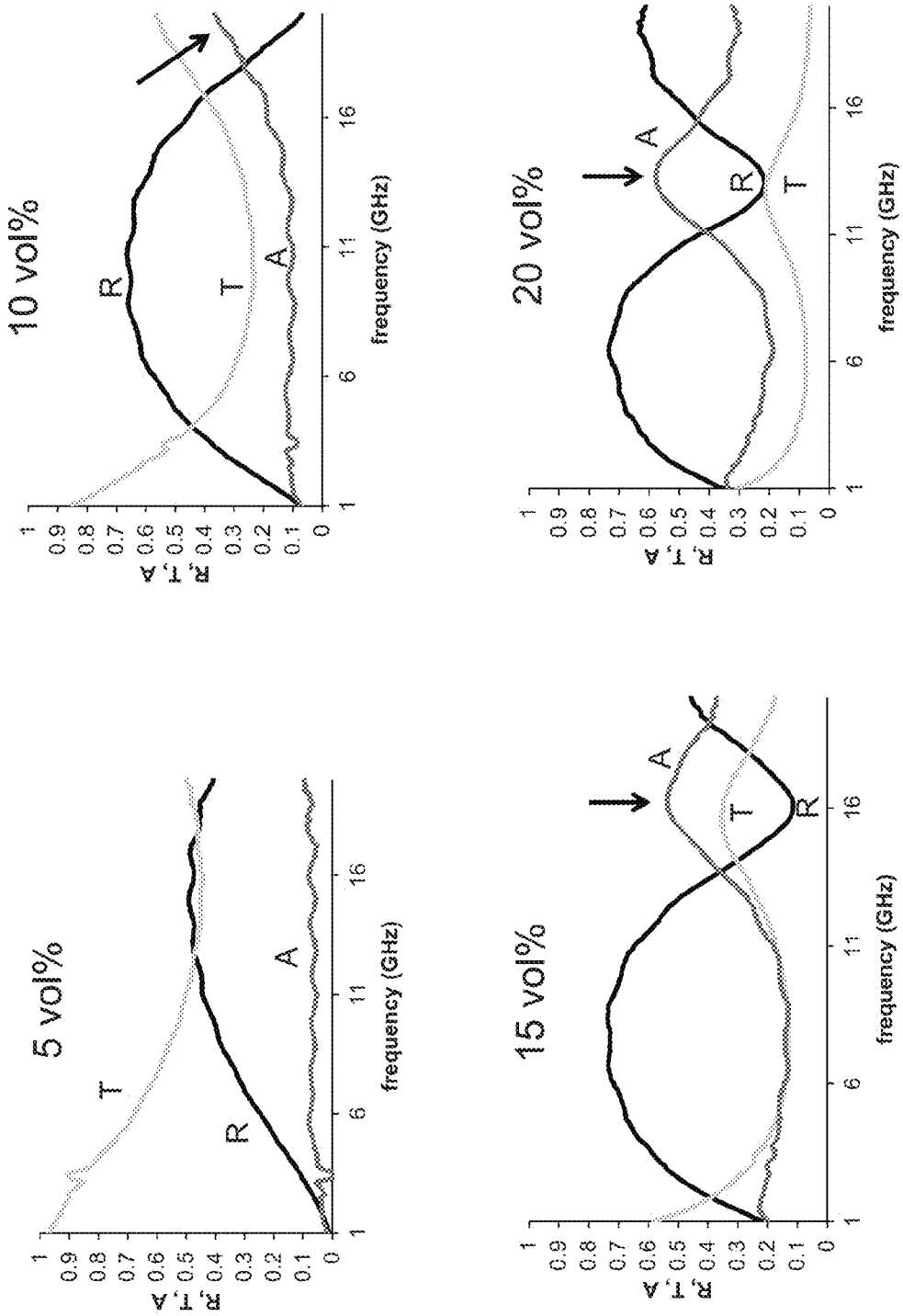
FIG. 1 illustrates reflection (R), absorption (A), and transmission (T) graphical plots for 5 vol %, 10 vol %, 15 vol %, and 20 vol % loadings of graphene in ABS for compositions having about 2 mm thickness.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. "On the order of" can mean approximately, a fraction thereof, or a multiple thereof.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. All ranges disclosed herein are inclusive and combinable (e.g., ranges of "up to 25 volume %, or, more specifically 5 volume % to 20 volume %" is inclusive of the endpoints and all intermediate values of the ranges of "5 volume % to 25 volume %," etc.).

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % and/or volume % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations. A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

References in the specification and concluding claims to parts by volume, of a particular element or component in a composition or article, denotes the volume relationship between the element or component and any other elements or components in the composition or article for which a part by volume is expressed. Thus, in a compound containing 2 parts by volume of component X and 5 parts by volume component Y, X and Y are present at a volume ratio of 2:5, and are present in such ratio regardless of whether additional components are contained in the compound.

A volume percent (vol %) of a component, unless specifically stated to the contrary, is based on the total volume of the formulation or composition in which the component is included. For example if a particular element or component in a composition or article is said to have 8% by volume, it is understood that this percentage is relative to a total compositional percentage of 100% by volume.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In an aspect, a composition is provided for destructive interference of EM radiation. As an example, the destructive interference can occur in at least a portion of the frequency range from about 1 GHz to about 20 GHz. As a further example, the composition can comprise a dielectric and a conductive filler.

In an aspect, the dielectric can comprise a thermoplastic polymer. As an example, various thermoplastic resins such as polypropylene, polyethylene, polystyrene, polyvinyl chloride, polyacetal, polyethylene terephthalate, polycarbonate, polyvinyl acetate, polyamide, polyamide imide, polyether imide, polyether ether ketone, polyvinyl alcohol, poly phenylene ether, poly(meth)acrylate, and liquid crystal polymer; and various thermosetting resins such as epoxy resin, vinyl ester resin, phenol resin, unsaturated polyester resin, furan resins, imide resin, urethane resin, melamine resin, silicone resin and urea resin; as well as various elastomers such as natural rubber, styrene butadiene rubber (SBR), butadiene rubber (BR), polyisoprene rubber (IR), ethylene-propylene rubber (EPDM), nitrile rubber (NBR), polychloroprene rubber (CR), isobutylene isoprene rubber (IIR), polyurethane rubber, silicone rubber, fluorine rubber, acrylic rubber (ACM), epichlorohydrin rubber, ethylene acrylic rubber, norbornene rubber and thermoplastic elastomer can be enumerated as the dielectric. Furthermore, the dielectric may be in various forms of composition, such as adhesive, fibers, paint, ink, etc. As a further example, the dielectric can comprise acrylonitrile butadiene styrene. As used herein, the term "ABS" or "acrylonitrile-butadiene-styrene copolymer" refers to an acrylonitrile-butadiene-styrene polymer which can be an acrylonitrile-butadiene-styrene terpolymer or a blend of styrene-butadiene rubber and styrene-acrylonitrile copolymer.

In an aspect, the conductive filler can comprise a lossy filler. As an example, a lossy filler can comprise materials having non-zero imaginary permittivity and permeability. As a further example, the conductive filler can comprise graphene, polypyrrole, stainless steel, carbonyl iron, or multi-walled carbon nano tube, or a mixture thereof. Materials exhibiting similar permittivity and permeability properties to that of graphene, polypyrrole, stainless steel, carbonyl iron, or multi-walled carbon nano tube, or a mixture thereof, can also be used. As an example, other compositions can be used such as compositions exhibiting similar imaginary permittivity and imaginary permeability similar to the compositions listed in the table below:

| Conductive filler by vol % of composition | e" range (imaginary permittivity) | u" range (imaginary permeability) |
| --- | --- | --- |
| 15 vol % graphene | 0.608i to 13.42i | 0i |
| 20 vol % graphene | 0i to 13.44i | 0i |
| 5 vol % SS flake + 10 vol % SS spheres | 0 to 9.87i | 0i to 0.646i |
| 7.5 vol % SS flake + 10 vol % SS sphere | 0.35i to 10.16i | 0.108i to 0.952i |
| 7.5 vol % SS flake + 20 vol % SS sphere | 7.4i to 12i | 0.008i to 0.827i |
| 12.5 vol % SS flake | 3.27i to 11.97i | 0.0175i to 1.41i |
| 15 vol % carbonyl iron flake | 1.83i to 5.49i | 0.46i to 2.15i |
| 20 vol % carbonyl iron flake | 2.97i to 29.2i | 0.62i to 3.18i |
| 20 vol % Metglas 2705M | 10.8i to 29.2i | 0i to 0.99i |
| 1.79 vol % MWCNT | 23i to 197i | 0i |

In an aspect, graphene can comprise a single planar sheet of covalently bonded carbon atoms. As an example, graphene can be formed of a plane of carbon atoms comprising sp2-bonded carbon forming a regular hexagonal lattice with an aromatic structure. As a further example, graphene can comprise hybrid orbitals formed by sp2 hybridization. In an aspect, in the sp2 hybridization, the 2s orbital and two of the three 2p orbitals mix to form three sp2 orbitals. The one remaining p-orbital forms a pi-bond between the carbon atoms. Similar to the structure of benzene, the structure of graphene can comprise a conjugated ring of the p-orbitals which exhibits a stabilization that is stronger than would be expected by the stabilization of conjugation alone, i.e., the graphene structure is aromatic. Other structures, forms, and/ or layers of graphene can be used. Materials exhibiting similar permittivity and permeability properties to that of graphene can be used.

In an aspect, polypyrrole can comprise a homopolymer or copolymer of pyrrole or its derivative, such as its N-alkyl derivative. Other structures, forms, and/or derivatives of polypyrrole can be used. Materials exhibiting similar permittivity and permeability properties to that of polypyrrole can be used.

In an aspect, the conductive filler can be mixed with at least a portion of the dielectric. As an example, the conductive filler can be extruded with at least a portion of the dielectric. As a further example, the percentage volume of the conductive filler relative to the total volume of the mixed composition is configured such that the wavelength of sensitivity for the composition is on the order of a wavelength of an incident electromagnetic radiation in at least a portion of the frequency range from about 1 GHz to about 20 GHz. In an aspect, the wavelength of sensitivity can be determined (e.g., calculated, estimated, etc.) using the formula:

$$\lambda = c/(f*(\in'\mu')^{0.5}),$$

wherein, $\lambda$ is the wavelength of sensitivity, c is the speed of light, f is frequency, $\in'$ is the real permittivity, and $\in'$ is the real permeability.

In an aspect, the percentage volume (vol %) of the conductive filler relative to the total volume of the composition can be from about 1.8% to about 50%. As an example, the percentage volume of the conductive filler relative to the total volume of the composition can be from about 5% to about 50%. As another example, the percentage volume of the conductive filler relative to the total volume of the composition can be from about 5% to about 30%. As a further example, the percentage volume of the conductive filler relative to the total volume of the composition can be from about 15% to about 20%.

In an aspect, the percentage volume (vol %) of the dielectric relative to the total volume of the composition can be from about 50% to about 98.2%. As an example, the percentage volume of the dielectric relative to the total volume of the composition can be from about 50% to about 95%. As another example, the percentage volume of the dielectric relative to the total volume of the composition can be from about 70% to about 95%. As a further example, the percentage volume of the dielectric relative to the total volume of the composition can be from about 80% to about 85%.

In an aspect, the percentage volume (vol %) of the conductive filler relative to the total volume of the composition can be from about 1.8% to about 50% and the percentage volume (vol %) of the dielectric relative to the total volume of the composition can be from about 50% to about 98.2%. As an example, the percentage volume of the conductive filler relative to the total volume of the composition can be from about 5% to about 50% and the percentage volume of the dielectric relative to the total volume of the composition can be from about 50% to about 95%. As another example, the percentage volume of the conductive filler relative to the total volume of the composition can be from about 5% to about 30% and percentage volume of the dielectric relative to the total volume of the composition can be from about 70% to about 95%. As a further example, the percentage volume of the conductive filler relative to the total volume of the composition can be from about 15% to about 20% and the percentage volume of the dielectric relative to the total volume of the composition can be from about 80% to about 85%.

In an aspect, the thickness of the composition measured from an incident surface can be on the order of the wavelength of sensitivity of the composition in at least a portion of the frequency range from about 1 GHz to about 20 GHz. Other thicknesses and surface shaping can be used.

In an aspect, the destructive interference phenomena can be dependent upon a conductive filler loading level and more specifically the real permittivity of the composition. In an aspect, as the permittivity of the composition increases with increased conductive filler loadings, the destructive interference phenomena tends to shift to lower frequencies.

In an aspect, a shift in the frequency of incident EM waves resulting in the destructive interference phenomena is demonstrated, by example, in a composition comprising 15 vol % graphene mixed with ABS. As an example, the wavelength of sensitivity for the destructive interference phenomena is inversely proportional to the square root of the real permittivity and permeability and frequency. As a further example, the 15 vol % graphene exemplary composition comprises the following properties: $\in'=14.4$ and $\mu'=1.2$ at 16.5 GHz. In an aspect, using the property values of the 15 vol % graphene exemplary composition in the aforementioned equation for wavelength of sensitivity yields a wavelength of about 4.4 mm. As an example, the destructive interference phenomena can be a half-wave interference phenomena resulting in destructive interference at about 2 mm for 15 vol % graphene exemplary composition.

In an aspect, a composition comprising 20 vol % graphene in ABS, the composition comprises the following properties: $\in'=26$ and $\mu'=1.2$ at 13 GHz. As an example, calculation of the half wave interference wavelength yields about 2 mm. As a further example, the thickness of the exemplary composition can be 2 mm to result in destructive interference 20 vol % graphene in ABS at 13 GHz.

In an aspect, a method of increasing destructive interference in at least a portion of the frequency range from about 1 GHz to about 20 GHz can comprise providing a composition comprising a dielectric and a conductive filler mixed with at least a portion of the dielectric, wherein the percentage volume of the conductive filler relative to the total volume of the composition is configured such that the wavelength of sensitivity for the composition is on the order of a wavelength of an incident electromagnetic radiation in at least a portion of the frequency range from about 1 GHz to about 20 GHz. Incident electromagnetic radiation can be received by the composition in at least a portion of the frequency range from about 1 GHz to about 20 GHz. Accordingly, a reflective wave of electromagnetic radiation can be generated in response to receiving the incident electromagnetic radiation and the reflective wave can facilitate destructive interference of incoming electromagnetic radiation.

In an aspect, a method of increasing destructive interference in at least a portion of the frequency range from about 1 GHz to about 20 GHz can comprise providing a composition comprising a dielectric and a conductive filler mixed with at least a portion of the dielectric, wherein the thickness of the composition measured from an incident surface is on the order of a wavelength of sensitivity of the composition in at least a portion of the frequency range from about 1 GHz to about 20 GHz. Incident electromagnetic radiation can be received by the composition in at least a portion of the frequency range from about 1 GHz to about 20 GHz. Accordingly, a reflective wave of electromagnetic radiation can be generated in response to receiving the incident electromagnetic radiation and the reflective wave can facilitate destructive interference of incoming electromagnetic radiation.

The present disclosure comprises at least the following embodiments.

Embodiment 1

A composition for destructive interference in at least a portion of the frequency range from about 1 GHz to about 20 GHz, the composition comprising: a dielectric: and a conductive filler mixed with at least a portion of the dielectric, wherein the percentage volume of the conductive filler relative to the total volume of the composition is configured such that the wavelength of sensitivity for the composition is on the order of a wavelength of an incident electromagnetic radiation in at least a portion of the frequency range from about 1 GHz to about 20 GHz.

Embodiment 2

The composition of embodiment 1, wherein the dielectric comprises a thermoplastic polymer.

Embodiment 3

The composition of embodiment 1, wherein the dielectric comprises acrylonitrile butadiene styrene.

Embodiment 4

The composition of any of embodiments 1-3, wherein the conductive filler comprises a lossy filler.

Embodiment 5

The composition of any of embodiments 1-4, wherein the conductive filler comprises graphene, polypyrrole, stainless steel, carbonyl iron, or multi-walled carbon nano tube, or a mixture thereof.

Embodiment 6

The composition of any of embodiments 1-5, wherein the percentage volume of the conductive filler relative to the total volume of the composition is from about 1.8% to about 50%.

Embodiment 7

The composition of any of embodiments 1-5, wherein the percentage volume of the conductive filler relative to the total volume of the composition is from about 5% to about 30%.

Embodiment 8

The composition of any of embodiments 1-5, wherein the percentage volume of the conductive filler relative to the total volume of the composition is from about 15% to about 20%.

Embodiment 9

The composition of any of embodiments 1-8, wherein the thickness of the composition measured from an incident surface is on the order of the wavelength of sensitivity of the composition in at least a portion of the frequency range from about 1 GHz to about 20 GHz.

Embodiment 10

A method of increasing destructive interference in at least a portion of the frequency range from about 1 GHz to about 20 GHz, the method comprising: providing the composition of any of embodiments 1-9; and receiving, at the composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Embodiment 11

A composition for destructive interference in at least a portion of the frequency range of from about 1 GHz to about 20 GHz, the composition comprising: a dielectric; and a conductive filler mixed with at least a portion of the dielectric, wherein the thickness of the composition measured from an incident surface is on the order of a wavelength of sensitivity of the composition in at least a portion of the frequency range from about 1 GHz to about 20 GHz.

Embodiment 12

The composition of embodiment 11, wherein the dielectric comprises a thermoplastic polymer.

Embodiment 13

The composition of embodiment 11, wherein the dielectric comprises acrylonitrile butadiene styrene.

Embodiment 14

The composition of any of embodiments 11-13, wherein the conductive filler comprises a lossy filler.

Embodiment 15

The composition of any of embodiments 11-13, wherein the conductive filler comprises graphene, polypyrrole, stainless steel, carbonyl iron, or multi-walled carbon nano tube, or a mixture thereof.

Embodiment 16

The composition of any of embodiments 11-15, wherein the percentage volume of the conductive filler relative to the total volume of the composition that is from about 1.8% to about 50%.

Embodiment 17

The composition of any of embodiments 11-15, wherein the percentage volume of the conductive filler relative to the total volume of the composition that is from about 5% to about 30%.

Embodiment 18

The composition of any of embodiments 11-15, wherein the percentage volume of the conductive filler relative to the total volume of the composition that is from about 15% to about 20%.

Embodiment 19

The composition of any of embodiments 11-15, wherein the thickness of the composition measured from an incident surface is about half of the wavelength of sensitivity of the composition in at least a portion of the frequency range from about 1 GHz to about 20 GHz.

Embodiment 20

The composition of any of embodiments 11-19, wherein the thickness of the composition measured from an incident surface is a fraction of the wavelength of sensitivity of the composition in at least a portion of the frequency range from about 1 GHz to about 20 GHz.

Embodiment 21

A method of increasing destructive interference in at least a portion of the frequency range from about 1 GHz to about 20 GHz, the method comprising: providing the composition of any of embodiments 11-20; and receiving, at the composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

Embodiment 22

A composition for destructive interference in at least a portion of the frequency range from about 1 GHz to about 20 GHz, the composition comprising: a dielectric; and a conductive filler mixed with at least a portion of the dielectric, wherein the percentage volume of the conductive filler relative to the total volume of the composition is configured such that a reflective wave of electromagnetic radiation is generated in response to receiving an incident wave of electromagnetic radiation, the reflective wave having a wavelength on the order of a wavelength of the incident wave of electromagnetic radiation.

Embodiment 23

The composition of embodiment 22, wherein the thickness of the composition measured from an incident surface is on the order of a wavelength of sensitivity of the composition in at least a portion of the frequency range from about 1 GHz to about 20 GHz.

Embodiment 24

The composition of embodiment 22, wherein the thickness of the composition measured from an incident surface is a fraction of the wavelength of sensitivity of the composition in at least a portion of the frequency range from about 1 GHz to about 20 GHz.

Embodiment 25

The composition of embodiment 22, wherein the thickness of the composition measured from an incident surface is about half of the wavelength of sensitivity of the composition in at least a portion of the frequency range from about 1 GHz to about 20 GHz.

In an aspect, the compositions according to the present disclosure can comprise other filling agents in addition to the above mentioned conductive fillers in order to modify the electromagnetic destructive interference properties of the composition properly.

The compositions of the present disclosure can be manufactured by various methods. The compositions of the present disclosure can be prepared with the aforementioned ingredients by a variety of methods involving intimate admixing of the materials with any additional additives desired in the formulation.

Preparation of the compositions can be performed in accordance with any known method by selecting an optimal method depending on the kind of the dielectric and/or conductive material used, for instance, in the case of a thermoplastic polymer, it may be accomplished by kneading under melted condition, dispersion, extrusion, and the like. The thus obtained compositions according to the present disclosure can remarkably reduce the influence of the electromagnetic waves, when it is processed into a film, a layered material, and/or a casing product for any apparatus and it is used at an appropriate place.

In an aspect, the thus obtained compositions according to the present disclosure can be used to form an enclosure for protecting circuit boards from EM radiation or to protect other electronics from exposure to EM radiation emitted by a discrete electronic component or components. As an example, an enclosure can have any shape that can be molded and can enclose electronic boards ("macroscopic" use) or discrete components ("microscopic use"). Example applications comprise enclosures such as cell phone housings, laptop housings, aircraft skeleta or skin, automobile electronic housings for boards and components, healthcare and related electronics (MRI housings, pacemaker housings), and the like.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

As illustrated in Table 1, an exemplary 5 vol % graphene filler composition comprising about 410.2 g ABS and about 45.0 g of graphene was prepared using a two screw extruder.

TABLE 1

| screw design | twin screw feeder #3 (S/N 920931) - mild mixing |  |
|---|---|---|
| material | ABS Cycolac MG47F-NA1000 w/graphene at 5 vol % extrudate |  |
| trial # | 1 |  |

|  | set | Actual (act) |
|---|---|---|
| temp (C.) - zone 1 (feed) | 220 | 218.6 |
| temp - zone 2 | 220 | 220.4 |
| temp - zone 3 | 220 | 220.4 |
| temp - zone 4 | 220 | 221.2 |
| temp - zone 5 | 220 | 219.9 |
| temp - zone 6 (die) |  |  |

| RPM | 400 |
|---|---|
| torque (%) | 12.3 |
| die PSI | 168 |

TABLE 1-continued

| | |
|---|---|
| throughput (set) | 6 lb/hr |
| throughput (act) | 6.0418 |

As illustrated in Table 2, an exemplary 10 vol % graphene filler composition comprising about 369.3 g ABS and about 85.3 g of graphene was prepared using a two screw extruder.

TABLE 2

| screw design | twin screw feeder #3 (S/N 920931) - mild mixing |
| material | ABS Cycolac MG47F-NA1000 w/graphene |
| | at 10 vol % extrudate |
| trial # | 1 |

| | set | act |
|---|---|---|
| temp (C.) - zone 1 (feed) | 220 | 219.6 |
| temp - zone 2 | 220 | 219.8 |
| temp - zone 3 | 220 | 220.1 |
| temp - zone 4 | 220 | 221.7 |
| temp - zone 5 | 220 | 220.4 |
| temp - zone 6 (die) | | |

| | |
|---|---|
| RPM | 401 |
| torque (%) | 11.8 |
| die PSI | 201 |
| throughput (set) | 6 lb/hr |
| throughput (act) | 6.0239 |

As illustrated in Table 3, an exemplary 15 vol % graphene filler composition comprising about 332.4 g ABS and about 121.9 g of graphene was prepared using a two screw extruder.

TABLE 3

| screw design | twin screw feeder #3 (S/N 920931) - mild mixing |
| material | ABS Cycolac MG47F-NA1000 |
| | w/graphene at 15 vol % extrudate |
| trial # | 1 |

| | set | act |
|---|---|---|
| temp (C.) - zone 1 (feed) | 220 | 219.2 |
| temp - zone 2 | 220 | 220.2 |
| temp - zone 3 | 220 | 220.7 |
| temp - zone 4 | 220 | 222.1 |
| temp - zone 5 | 220 | 221.4 |
| temp - zone 6 (die) | | |

| | |
|---|---|
| RPM | 401 |
| torque (%) | 12.5 |
| die PSI | 214 |
| throughput (set) | 6 lb/hr |
| throughput (act) | 6.0656 |

As illustrated in Table 4, an exemplary 20 vol % graphene filler composition comprising about 299.3 g ABS and about 155.4 g of graphene was prepared using a two screw extruder.

TABLE 4

| screw design | twin screw feeder #3 (S/N 920931) - mild mixing |
| material | ABS Cycolac MG47F-NA1000 |
| | w/graphene at 20 vol % extrudate |
| trial # | 1 |

| | set | act |
|---|---|---|
| Temp (C.) - zone 1 (feed) | 220 | 219.2 |
| temp - zone 2 | 220 | 219.9 |
| temp - zone 3 | 220 | 220.7 |
| temp - zone 4 | 220 | 222.8 |
| temp - zone 5 | 220 | 220.4 |
| temp - zone 6 (die) | | |

| | |
|---|---|
| RPM | 402 |
| torque (%) | 12.4 |
| die PSI | 235 |
| throughput (set) | 6 lb/hr |
| throughput (act) | 6.0537 |

In an aspect, the extrusion extrudate from the blending process illustrated in one or more of Tables 1-4 was compression molded. As an example, compression molding was facilitated by a Tetrahedron MTP-14 press. As a further example, the press was set to about 395 F (~201 C). Accordingly, at desired temp, the composition extrudate was placed in a mold, covered with steel plates, and inserted in the press. Platens can be closed with about 0 lbs force. At the set temperature, with about 0 lbs force, manually compression was provided for a set time (e.g., about 10 min). Press force was increased to about 1000 lbs for about 5 min. Press force was further increased to about 5000 lbs for about 5 min. Press force was further increased to about 10,000 lbs for about 5 min. The press was cooled to a set cooling temperature (e.g., about 180 F) under pressure and the compression molded composition was removed.

Figure 2:
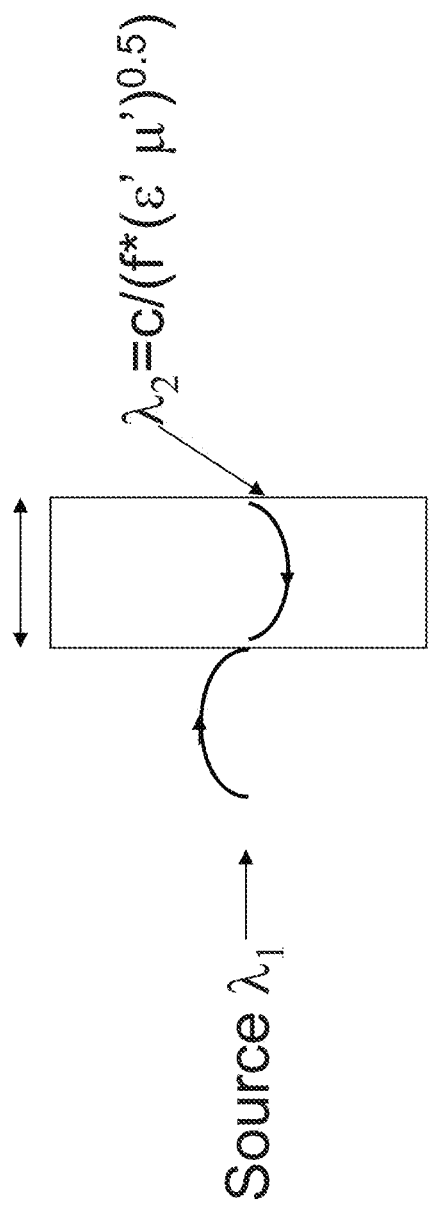
FIG. 2 is a block diagram illustrating the an exemplary wavelength of sensitivity.

FIG. 1 illustrates a graphical representation of reflection (R), absorption (A), and transmission (T) properties of the exemplary compositions prepared in accordance with Tables 1-4 and compression molded to 2 mm thickness samples. As illustrated in FIG. 1, 15 vol % and 20 vol % graphene demonstrate the destructive interference phenomena and yield elevated levels of absorption and reduced levels of reflection. As an example, at 15 vol % graphene the destructive interference phenomena is shown occurring strongest between 15-17 GHz, while for the 20 vol % graphene the destructive interference phenomena is shown occurring strongest between 11-15 GHz. As a further example, In an aspect, as illustrated in FIG. 2, a shift in the frequency of incident EM waves resulting in the destructive interference phenomena is shown in a composition comprising 15 vol % grapheme mixed with ABS. As an example, the wavelength of sensitivity for the destructive interference phenomena is inversely proportional to the square root of the real permittivity and permeability and frequency. As a further example, the 15 vol % graphene exemplary composition comprises the following properties: $\in'$=14.4 and $\mu'$=1.2 at 16.5 GHz. In an aspect, using the property values of the 15 vol % graphene exemplary composition in the aforementioned equation for wavelength of sensitivity yields a wavelength of about 4.4 mm. As an example, the destructive interference phenomena can be a half-wave interference phenomena resulting in destructive interference at about 2.2 mm for 15 vol % graphene exemplary composition.

In an aspect, a composition comprising 20 vol % graphene in ABS, the composition comprises the following properties:

$\varepsilon'=26$ and $\mu'=1.2$ at 13 GHz. As an example, calculation of the half wave interference wavelength yields about 2 mm. As a further example, the thickness of the exemplary composition can be 2 mm to result in destructive interference 20 vol % graphene in ABS at 13 GHz.

Figure 3:
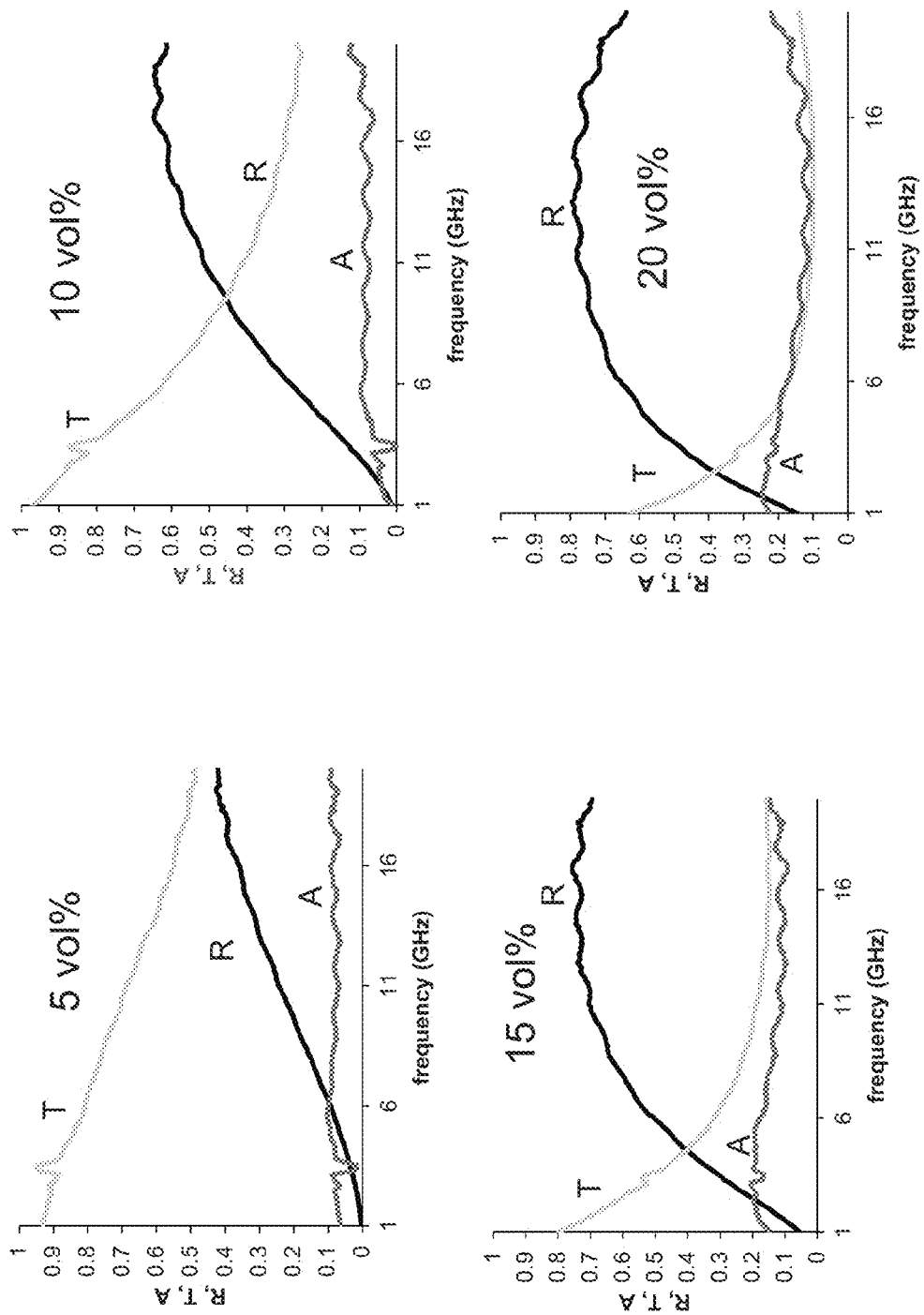
FIG. 3 illustrates reflection (R), absorption (A), and transmission (T) graphical plots for 5 vol %, 10 vol %, 15 vol %, and 20 vol % loadings of graphene in ABS for compositions having about 1 mm thickness.

FIG. 3 illustrates a graphical representation of reflection (R), absorption (A), and transmission (T) properties of the exemplary compositions prepared in accordance with Tables 1-4 and compression molded to 1 mm thickness samples.

As illustrated in Table 5, an exemplary 30 vol % polypyrrole filler composition comprising about 316.9 g ABS and about 137.3 g of polypyrrole was prepared using a two screw extruder.

TABLE 5

| screw design material | twin screw feeder #3 (S/N 920931) - mild mixing ABS Cycolac MG47F-NA1000 w/polypyrrole, doped at 30 vol % for 'drool' | |
|---|---|---|
| trial # | 1 | |
| | set | act |
| temp (C.) - zone 1 (feed) | 220 | 218.3 |
| temp - zone 2 | 220 | 220.2 |
| temp - zone 3 | 220 | 220.0 |
| temp - zone 4 | 220 | 220.1 |
| temp - zone 5 | 220 | 219.8 |
| temp - zone 6 (die) | | |
| RPM | | 401 |
| torque (%) | | 8.6 |
| die PSI | | 82 |
| throughput (set) | | 6 lb/hr |
| throughput (act) | | 3.6310 |

As illustrated in Table 6, an exemplary 40 vol % polypyrrole filler composition comprising about 271.7 g ABS and about 182.8 g of polypyrrole was prepared using a two screw extruder. As illustrated in Table 6, the feed rate was changed from 6 to 1.5 to 2 lb/hr due to clogging of feed chute.

TABLE 6

| screw design material | twin screw feeder #3 (S/N 920931) - mild mixing ABS Cycolac MG47F-NA1000 w/polypyrrole, doped at 40 vol % for 'drool' | | | |
|---|---|---|---|---|
| trial # | 1 | | 1a | |
| | set | act | set | act |
| Temp (C.) - zone 1 (feed) | 220 | n/a | 220 | 218.7 |
| temp - zone 2 | 220 | n/a | 220 | 219.8 |
| temp - zone 3 | 220 | n/a | 220 | 220.7 |
| temp - zone 4 | 220 | n/a | 220 | 220.3 |
| temp - zone 5 | 220 | n/a | 220 | 220.2 |
| temp - zone 6 (die) | | | | |
| RPM | 400 | | 400 | |
| torque (%) | n/a | | 6.6 | |
| die PSI | n/a | | 104 | |
| throughput (set) | 6 lb/hr | | 2 lb/hr | |
| throughput (act) | 5.9703 | | 2.0417 | |

As illustrated in Table 7, an exemplary 50 vol % polypyrrole filler composition comprising about 226.0 g ABS and about 228.2 g of polypyrrole was prepared using a two screw extruder. As illustrated in Table 7, the feed rate was changed from 2 to 1.5 to 1 lb/hr due to clogging of feed chute.

TABLE 7

| screw design material | twin screw feeder #3 (S/N 920931) - mild mixing ABS Cycolac MG47F-NA1000 w/polypyrrole, doped at 50 vol % extrudate | | | |
|---|---|---|---|---|
| trial # | 1 | | 1a | |
| | set | act | set | act |
| temp (C.) - zone 1 (feed) | 220 | 220.6 | 220 | 220.9 |
| temp - zone 2 | 220 | 220.1 | 220 | 220.0 |
| temp - zone 3 | 220 | 220.5 | 220 | 220.5 |
| temp - zone 4 | 220 | 220.5 | 220 | 220.1 |
| temp - zone 5 | 220 | 220.4 | 220 | 220.6 |
| temp - zone 6 (die) | | | | |
| RPM | 400 | | 400 | |
| torque (%) | 6.2 | | 5.6 | |
| die PSI | 107 | | 112 | |
| throughput (set) | 2 lb/hr | | 1 lb/hr | |
| throughput (act) | 2.0417 | | 1.0000 | |

Figure 4:
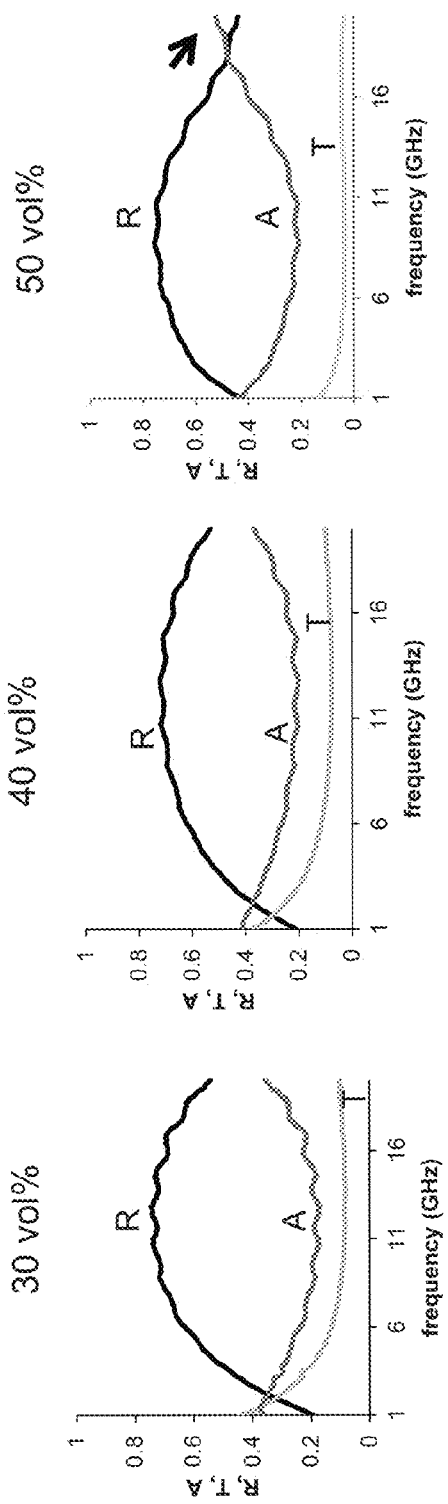
FIG. 4 illustrates reflection (R), absorption (A), and transmission (T) graphical plots for a composition having 30 vol %, 40 vol %, and 50 vol % polypyrrole in ABS at about 1 mm thickness.
Figure 4:
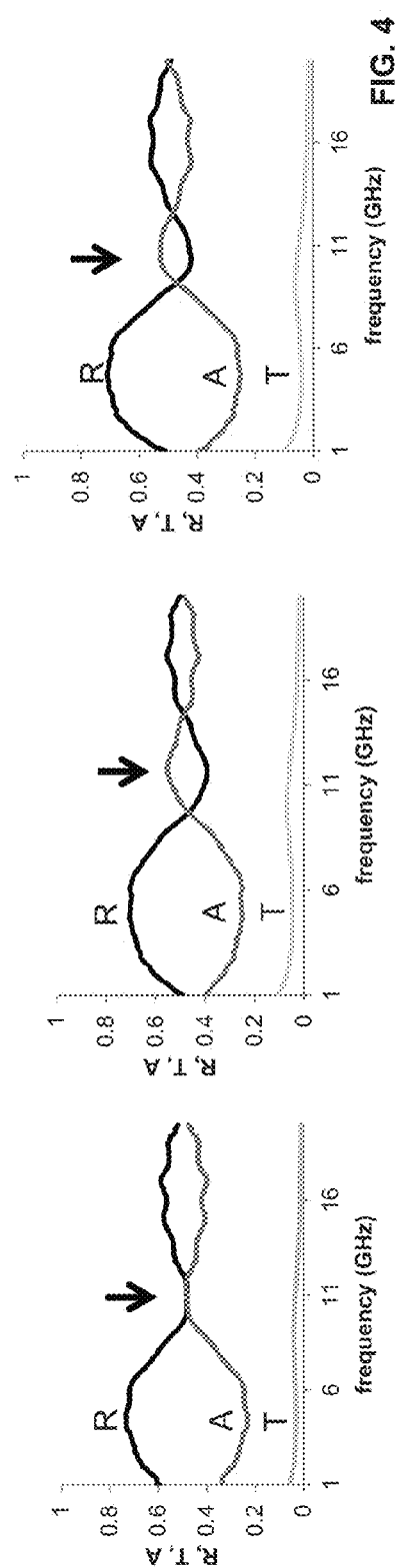

In an aspect, FIG. 4 illustrates reflection (R), absorption (A) and transmission (T) graphical plots for exemplary compositions prepared in accordance with Tables 5-7 and compression molded to 1 mm thickness samples. As an example, the loadings at 1 mm thickness demonstrate minimal destructive interference phenomena. As a further example, when the thickness of the composition is doubled to about 2 mm for 30 vol %, 40 vol %, and 50 vol % polypyrrole in ABS, then a distinct interference phenomena is witnessed at about 10 GHz for 30 vol %, 40 vol %, and 50 vol % polypyrrole in ABS.

As illustrated in Table 8, an exemplary 5 vol % stainless steel (SS) flake with 10 vol % SS sphere SS in ABS composition comprising about 193.7 g ABS, about 78.9 g SS flake, and about 181.9 g SS sphere was prepared using a two screw extruder.

TABLE 8

| screw design material | twin screw feeder #3 (S/N 920931) - mild mixing ABS Cycolac MG47F-NA1000 w/SS flake at 5 vol % and SS spheres at 10 vol % for 'drool' | |
|---|---|---|
| trial # | 1 | |
| melt temp (C.) | 204 | |
| | set | act |
| temp - zone 1 (feed) | 220 | 219.4 |
| temp - zone 2 | 220 | 220.1 |
| temp - zone 3 | 220 | 221.0 |
| temp - zone 4 | 220 | 220.5 |
| temp - zone 5 | 220 | 219.9 |
| temp - zone 6 (die) | | |
| RPM | | 300 |
| torque (%) | | 7.4 |
| die PSI | | 317 |
| throughput (set) | | 4 lb/hr |
| throughput (act) | | 3.9763 |

Figure 5:
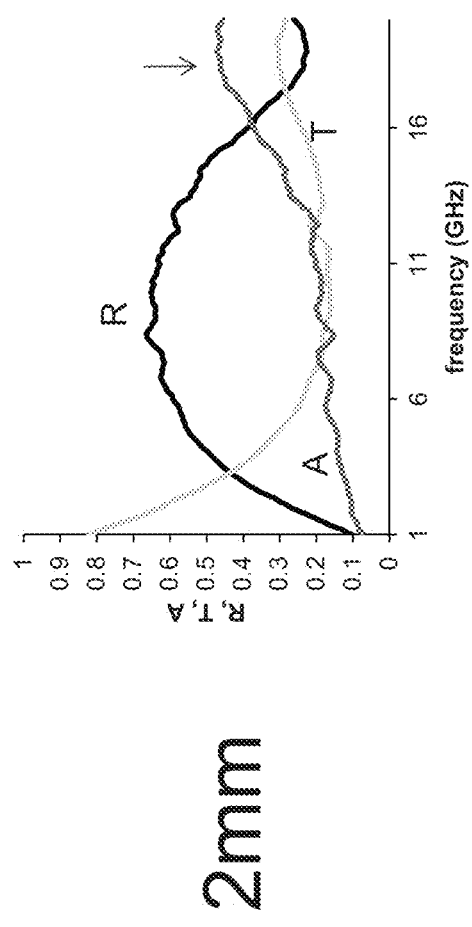
FIG. 5 illustrates reflection (R), absorption (A), and transmission (T) graphical plots for a composition having 5 vol % stainless steel (SS) flake with 10 vol % SS sphere SS in ABS.

In an aspect, FIG. 5 illustrates reflection (R), absorption (A) and transmission (T) graphical plots for a composition having 5 vol % stainless steel (SS) flake with 10 vol % SS sphere SS in ABS prepared in accordance with Table 8 and compression molded to 2 mm thickness samples. As an example, the destructive interference phenomenon begins to take shape at the high frequency band-edge at about 20 GHz.

As illustrated in Table 9, an exemplary 7.5 vol % stainless steel (SS) flake with 10 vol % SS sphere SS in ABS composition comprising about 174.9 g ABS, about 110.1 g SS flake, and about 169.3 g SS sphere was prepared using a two screw

TABLE 9

| screw design | twin screw feeder #3 (S/N 920931) - mild mixing |
| --- | --- |
| material | ABS Cycolac MG47F-NA1000 w/SS flake at 7.5 vol % and SS spheres at 10 vol % for 'drool' |
| trial # | 1 |
| melt temp (C.) | 207 |

| | set | act |
| --- | --- | --- |
| temp - zone 1 (feed) | 220 | 220.3 |
| temp - zone 2 | 220 | 220.1 |
| temp - zone 3 | 220 | 220.1 |
| temp - zone 4 | 220 | 220.9 |
| temp - zone 5 | 220 | 223.2 |
| temp - zone 6 (die) | | |

| RPM | 300 |
| --- | --- |
| torque (%) | 7.8 |
| die PSI | 256 |
| throughput (set) | 4 lb/hr |
| throughput (act) | 3.9346 |

As illustrated in Table 10, an exemplary 7.5 vol % stainless steel (SS) flake with 20 vol % SS sphere SS in ABS composition comprising about 116.1 g ABS, about 83.0 g SS flake, and about 255.3 g SS sphere was prepared using a two screw extruder.

TABLE 10

| screw design | twin screw feeder #3 (S/N 920931) - mild mixing |
| --- | --- |
| material | ABS Cycolac MG47F-NA1000 w/SS flake at 7.5 vol % and SS spheres at 20 vol % extrudate |
| trial # | 1 |
| melt temp (C.) | 210 |

| | set | act |
| --- | --- | --- |
| temp - zone 1 (feed) | 220 | 219.2 |
| temp - zone 2 | 220 | 220.1 |
| temp - zone 3 | 220 | 220.1 |
| temp - zone 4 | 220 | 220.3 |
| temp - zone 5 | 220 | 219.9 |
| temp - zone 6 (die) | | |

| RPM | 300 |
| --- | --- |
| torque (%) | 9.9 |
| die PSI | 27 |
| throughput (set) | 4 lb/hr |
| throughput (act) | 3.9882 |

Figure 6:
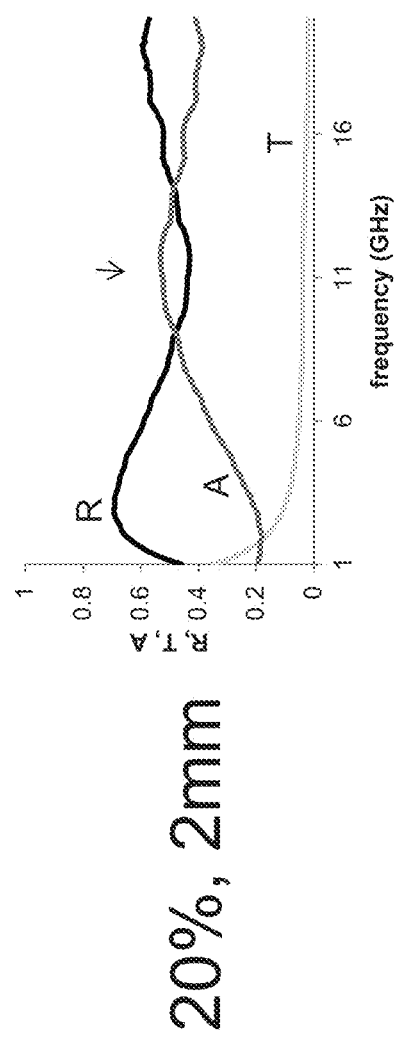
FIG. 6 illustrates reflection (R), absorption (A), and transmission (T) graphical plots for a composition having 7.5 vol % SS flake with 10 vol % SS sphere in ABS and a composition having 7.5 vol % SS flake with 20 vol % SS sphere in ABS.
Figure 6:
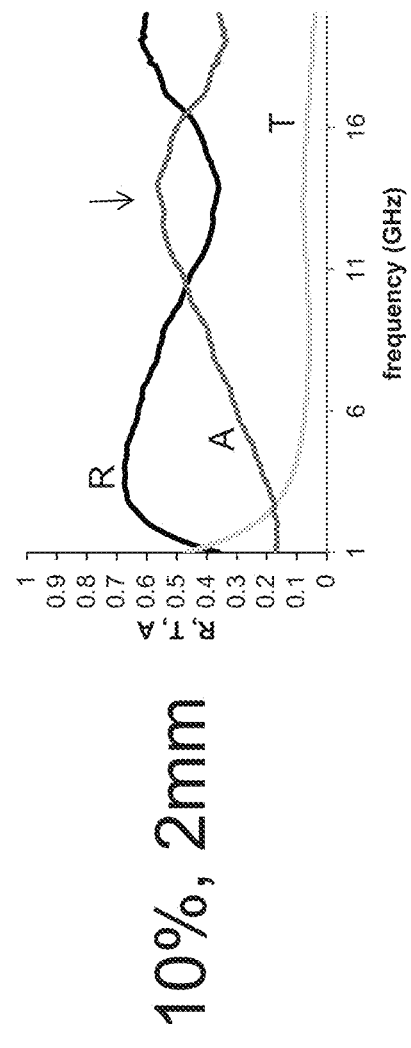

In an aspect, FIG. 6 illustrates reflection (R), absorption (A) and transmission (T) graphical plots for a composition having 7.5 vol % SS flake with 10 vol % SS sphere in ABS and prepared in accordance with Table 9 and compression molded to 2 mm thickness samples. As an example, the destructive interference phenomenon is evident at about 15 GHz. As a further example, destructive interference can be evident at about 10 GHZ for a composition having 7.5 vol % SS flake with 20 vol % SS sphere in ABS prepared in accordance with Table 10 and compression molded to 2 mm thickness samples.

As illustrated in Table 11, an exemplary composition having 12.5 vol % SS flake in ABS comprising about 252.0 g ABS and about 248.6 g of SS flake was prepared using a two screw extruder.

TABLE 11

| screw design | twin screw feeder #3 (S/N 920931) (w/agitator) - mild mixing |
| --- | --- |
| material | ABS Cycolac MG47F-NA1000 w/Ametek SS flake at 12.5 vol % (for 'drool') |
| trial # | 1 |

| | set | act |
| --- | --- | --- |
| temp (C.) - zone 1 (feed) | 220 | 218.8 |
| temp - zone 2 | 220 | 219.7 |
| temp - zone 3 | 220 | 220.8 |
| temp - zone 4 | 220 | 221.4 |
| temp - zone 5 | 220 | 220.5 |
| temp - zone 6 (die) | | |

| RPM | 400 |
| --- | --- |
| torque (%) | 9.1 |
| die PSI | 316 |
| throughput (set) | 6 lb/hr |
| throughput (act) | 6.0358 |

Figure 7:
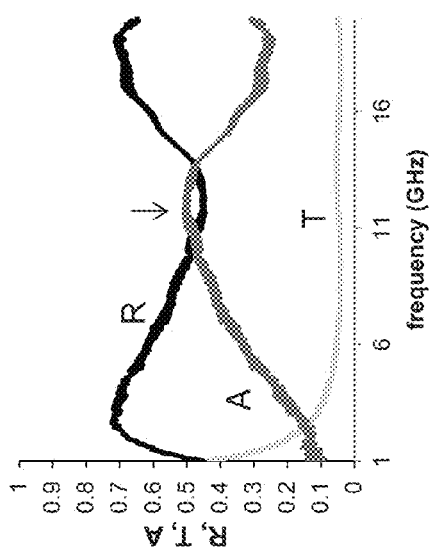
FIG. 7 illustrates reflection (R), absorption (A), and transmission (T) graphical plots for a composition having 12.5 vol % SS flake in ABS.
Figure 7:
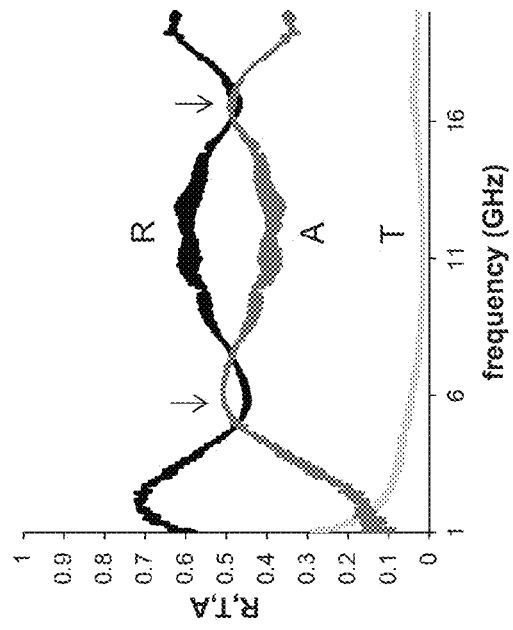

In an aspect, FIG. 7 illustrates reflection (R), absorption (A) and transmission (T) graphical plots for a composition having 12.5 vol % SS flake in ABS prepared in accordance with Table 11 and compression molded to 2 mm thickness samples. As an example, the destructive interference effect is evident from about 10 to about 15 GHz. As a further example, a composition having 12.5 vol % SS flake in ABS at 3 mm thickness can facilitate two interference peaks arising from half-wave interference and possibly ¾ wave or ¼ wave interference phenomenon. In an aspect, the permittivity and permeability are substantially identical for the compositions having 12.5 vol % SS flake in ABS, regardless of the thickness. Accordingly, a single monolithic composition sample is capable of providing broadband absorption. In an aspect, thickness can be varied to manipulate the absorption of EM radiation throughout a particular frequency range.

As illustrated in Table 12, an exemplary composition having 15 vol % carbonyl iron flake in ABS comprising about 215.4 g ABS and about 285.1 g of carbonyl iron flake was prepared using a two screw extruder.

TABLE 12

| screw design | twin screw feeder #3 (S/N 920931) (w/agitator) - mild mixing |
| --- | --- |
| material | ABS Cycolac MG47F-NA1000 w/ Carbonyl Iron EQ (IF-101, flake from A-G) at 15 vol % (for 'drool') |
| trial # | 1 |

| | set | act |
| --- | --- | --- |
| Temp (C.) - zone 1 (feed) | 210 | 212.0 |
| temp - zone 2 | 210 | 211.8 |
| temp - zone 3 | 210 | 209.9 |
| temp - zone 4 | 210 | 210.0 |
| temp - zone 5 | 210 | 209.4 |
| temp - zone 6 (die) | | |

| RPM | 400 |
| --- | --- |
| torque (%) | 8.6 |
| die PSI | 412 to ~840 |
| throughput (set) | 6 lb/hr |
| throughput (act) | 6.0299 |

As illustrated in Table 13, an exemplary composition having 20 vol % carbonyl iron flake in ABS comprising about 174.2 g ABS and about 326.6 g of carbonyl iron flake was prepared using a two screw extruder.

TABLE 13

| screw design | twin screw feeder #3 (S/N 920931) (w/agitator) - mild mixing |
|---|---|
| material | ABS Cycolac MG47F-NA1000 w/Carbonyl Iron EQ (IF-101, flake from A-G) at 20 vol % (for 'drool') |
| trial # | 1 |

|  | set | act |
|---|---|---|
| Temp (C.) - zone 1 (feed) | 210 | 210.5 |
| temp - zone 2 | 210 | 210.2 |
| temp - zone 3 | 210 | 206.3 |
| temp - zone 4 | 210 | 210.5 |
| temp - zone 5 | 210 | 210.2 |
| temp - zone 6 (die) | | |

| RPM | 400 |
|---|---|
| torque (%) | 8.6 |
| die PSI | 426 to ~900 |
| throughput (set) | 6 lb/hr |
| throughput (act) | 6.0239 |

Figure 8:
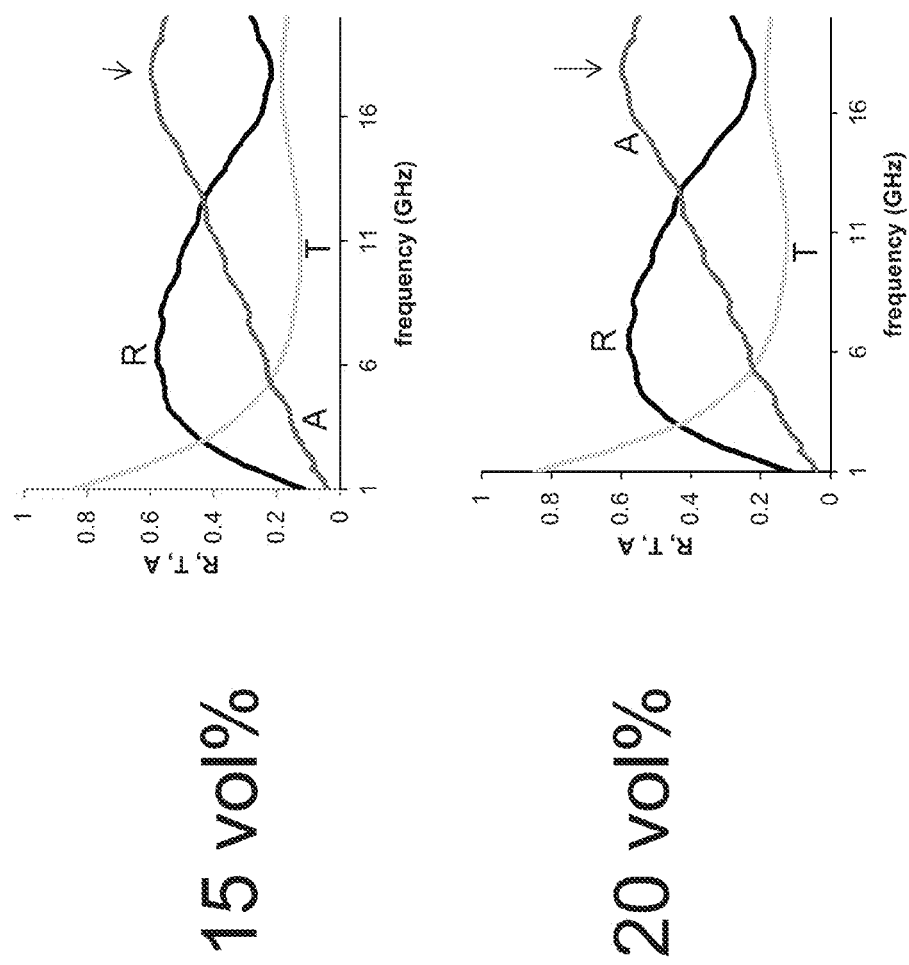
FIG. 8 illustrates reflection (R), absorption (A), and transmission (T) graphical plots for a composition having 15 vol % carbonyl iron flake in ABS and a composition having 20 vol % carbonyl iron flake in ABS.

In an aspect, FIG. 8 illustrates reflection (R), absorption (A) and transmission (T) graphical plots for a composition having 15 vol % carbonyl iron flake in ABS prepared in accordance with Table 12 and compression molded to 2 mm thickness samples. As an example, the interference phenomenon is apparent at about 18 GHz. As a further example, a composition having 20 vol % carbonyl iron flake in ABS prepared in accordance with Table 13 and compression molded to 2 mm thickness samples demonstrates destructive interference phenomenon shifted to slightly lower than 18 GHz with increased loading.

As illustrated in Table 14, an exemplary composition having 10 vol % Metglas 2705M in ABS comprising about 247.9 g ABS and about 207.2 g of Metglas 2705M was prepared using a two screw extruder.

TABLE 14

| screw design | twin screw feeder #3 (S/N 920931) - mild mixing |
|---|---|
| material | ABS Cycolac MG47F-NA1000 w/Metglas 2705M alloy flake at 10 vol % for 'drool' |
| trial # | 1 |

|  | set | act |
|---|---|---|
| temp - zone 1 (feed) | 220 | 219.9 |
| temp - zone 2 | 220 | 219.7 |
| temp - zone 3 | 220 | 220.4 |
| temp - zone 4 | 220 | 220.3 |
| temp - zone 5 | 220 | 220.4 |
| temp - zone 6 (die) | | |

| RPM | 300 |
|---|---|
| torque (%) | 10.7 |
| die PSI | 191 |
| throughput (set) | 4 lb/hr |
| throughput (act) | 4.2798 |

As illustrated in Table 15, an exemplary composition having 15 vol % Metglas 2705M in ABS comprising about 195.6 g ABS and about 259.8 g of Metglas 2705M was prepared using a two screw extruder.

TABLE 15

| screw design | twin screw feeder #3 (S/N 920931) - mild mixing |
|---|---|
| material | ABS Cycolac MG47F-NA1000 w/Metglas 2705M alloy flake at 15 vol % for 'drool' |
| trial # | 1 |

|  | set | act |
|---|---|---|
| Temp (C.) - zone 1 (feed) | 230 | 228.5 |
| temp - zone 2 | 230 | 230.1 |
| temp - zone 3 | 230 | 230.3 |
| temp - zone 4 | 230 | 230.8 |
| temp - zone 5 | 230 | 230.4 |
| temp - zone 6 (die) | | |

| RPM | 300 |
|---|---|
| torque (%) | 10.0 |
| die PSI | 148 |
| throughput (set) | 4 lb/hr |
| throughput (act) | 4.1251 |

As illustrated in Table 16, an exemplary composition having 20 vol % Metglas 2705M in ABS comprising about 158.1 g ABS and about 297.5 g of Metglas 2705M was prepared using a two screw extruder.

TABLE 16

| screw design | twin screw feeder #3 (S/N 920931) - mild mixing |
|---|---|
| material | ABS Cycolac MG47F-NA1000 w/Metglas 2705M alloy flake at 20 vol % for 'drool' |
| trial # | 1 |

|  | set | act |
|---|---|---|
| Temp (C.) - zone 1 (feed) | 230 | 227.8 |
| temp - zone 2 | 230 | 230.1 |
| temp - zone 3 | 230 | 230.8 |
| temp - zone 4 | 230 | 230.9 |
| temp - zone 5 | 230 | 229.7 |
| temp - zone 6 (die) | | |

| RPM | 300 |
|---|---|
| torque (%) | 10.3 |
| die PSI | 151 |
| throughput (set) | 4 lb/hr |
| throughput (act) | 4.1786 |

Figure 9:
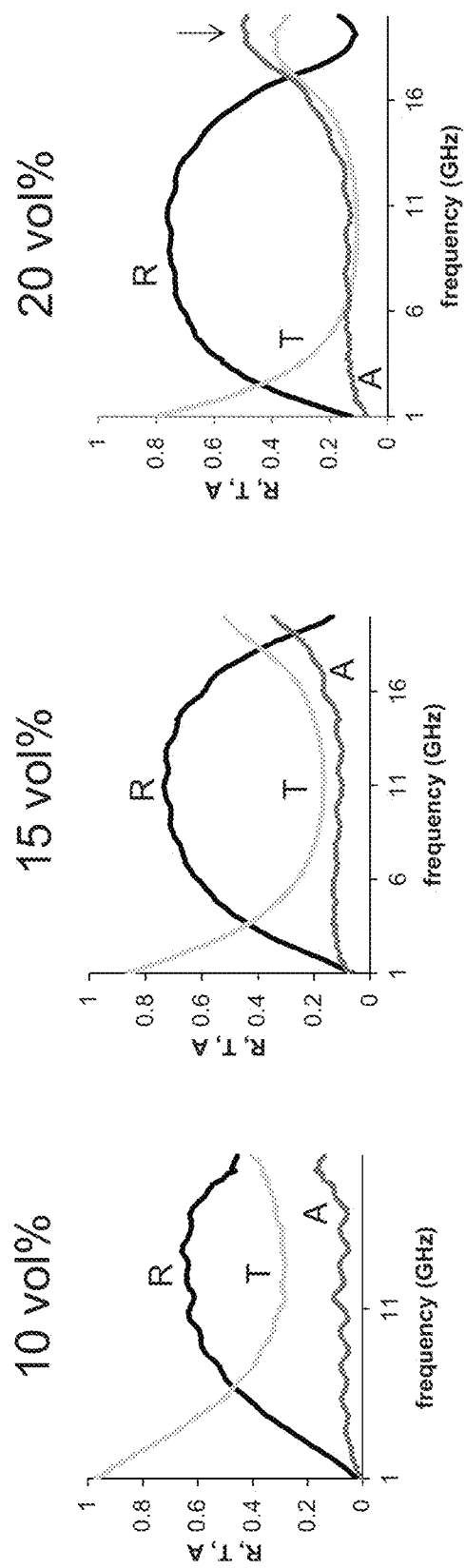
FIG. 9 illustrates reflection (R), absorption (A), and transmission (T) graphical plots for a composition having 10, 15 and 20 vol % Metglas 2705M in ABS.

In an aspect, FIG. 9 illustrates reflection (R), absorption (A) and transmission (T) graphical plots for a composition having 10, 15 and 20 vol % Metglas 2705M in ABS prepared in accordance with Tables 14-16 and compression molded to 2 mm thickness samples. As an example, the interference phenomenon begins to take shape as the loading increases and becomes evident at about 20 GHz.

As illustrated in Table 17, an exemplary composition having 1.79 vol % MWCNT in ABS comprising about 440.5 g ABS and about 13.8 g of MWCNT was prepared using a two screw extruder.

TABLE 17

| | | |
|---|---|---|
| screw design | twin screw feeder #3 (S/N 920931) - mild mixing | |
| material | ABS Cycolac MG47F-NA1000 w/Nanocyl NC7000 MWCNT at 3 wt %, 1.79 vol % for 'drool' | |
| trial # | 1 | |
| | set | act |
| temp (C.) - zone 1 (feed) | 220 | 220.0 |
| temp - zone 2 | 220 | 219.8 |
| temp - zone 3 | 220 | 220.6 |
| temp - zone 4 | 220 | 221.4 |
| temp - zone 5 | 220 | 221.7 |
| temp - zone 6 (die) | | |
| RPM | | 400 |
| torque (%) | | 13.1 |
| die PSI | | 303 |
| throughput (set) | | 6 lb/hr |
| throughput (act) | | 5.9406 |

Figure 10:
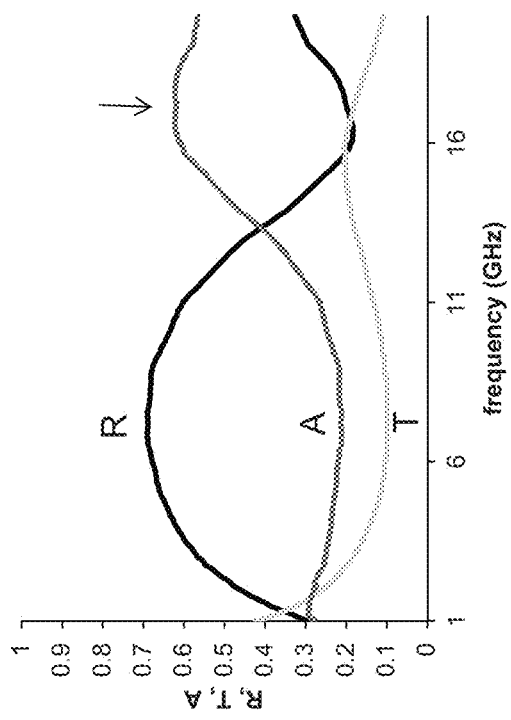
FIG. 10 illustrates reflection (R), absorption (A), and transmission (T) graphical plots for a composition having 1.79 vol % multiwalled carbon nanotube (MWCNT) in ABS.

In an aspect, FIG. 10 illustrates reflection (R), absorption (A) and transmission (T) graphical plots for a composition having 1.79 vol % MWCNT in ABS prepared in accordance with Table 17 and compression molded to 2 mm thickness samples. As an example, destructive interference phenomenon is illustrated from about 15 GHz to about 20 GHz.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A composition for destructive interference in at least a portion of the frequency range from about 1 GHz to about 20 GHz, the composition comprising:
   a dielectric; and
   a conductive filler blended with the dielectric to form a blended composition, wherein the percentage volume of the conductive filler relative to the total volume of the composition is configured such that the wavelength of sensitivity for the composition is on the order of a wavelength of an incident electromagnetic radiation in at least a portion of the frequency range from about 1 GHz to about 20 GHz, and wherein the incident electromagnetic radiation is reflected to effect destructive interference.

2. The composition of claim 1, wherein the dielectric comprises a thermoplastic polymer.

3. The composition of claim 1, wherein the dielectric comprises acrylonitrile butadiene styrene.

4. The composition of claim 1, wherein the conductive filler comprises a lossy filler.

5. The composition of claim 1, wherein the conductive filler comprises graphene, polypyrrole, stainless steel, carbonyl iron, or multi-walled carbon nano tube, or a mixture thereof.

6. The composition of claim 1, wherein the percentage volume of the conductive filler relative to the total volume of the composition is from about 1.8% to about 50%.

7. The composition of claim 1, wherein the percentage volume of the conductive filler relative to the total volume of the composition is from about 5% to about 30%.

8. The composition of claim 1, wherein the percentage volume of the conductive filler relative to the total volume of the composition is from about 15% to about 20%.

9. The composition of claim 1, wherein the thickness of the composition measured from an incident surface is on the order of the wavelength of sensitivity of the composition in at least a portion of the frequency range from about 1 GHz to about 20 GHz.

10. A method of increasing destructive interference in at least a portion of the frequency range from about 1 GHz to about 20 GHz, the method comprising:
    providing the blended composition of claim 1; and
    receiving, at the blended composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

11. A blended composition for destructive interference in at least a portion of the frequency range of from about 1 GHz to about 20 GHz, the composition comprising:
    a dielectric; and
    a conductive filler blended with at least a portion of the dielectric, wherein the thickness of the composition measured from an incident surface is on the order of a wavelength of sensitivity of the blended composition in at least a portion of the frequency range from about 1 GHz to about 20 GHz.

12. The composition of claim 11, wherein the dielectric comprises a thermoplastic polymer.

13. The composition of claim 11, wherein the dielectric comprises acrylonitrile butadiene styrene.

14. The composition of claim 11, wherein the conductive filler comprises a lossy filler.

15. The composition of claim 11, wherein the conductive filler comprises graphene, polypyrrole, stainless steel, carbonyl iron, or multi-walled carbon nano tube, or a mixture thereof.

16. The composition of claim 11, wherein the percentage volume of the conductive filler relative to the total volume of the composition that is from about 1.8% to about 50%.

17. The composition of claim 11, wherein the percentage volume of the conductive filler relative to the total volume of the composition that is from about 5% to about 30%.

18. The composition of claim 11, wherein the percentage volume of the conductive filler relative to the total volume of the composition that is from about 15% to about 20%.

19. The composition of claim 11, wherein the thickness of the composition measured from an incident surface is about half of the wavelength of sensitivity of the composition in at least a portion of the frequency range from about 1 GHz to about 20 GHz.

20. The composition of claim 11, wherein the thickness of the composition measured from an incident surface is a fraction of the wavelength of sensitivity of the composition in at least a portion of the frequency range from about 1 GHz to about 20 GHz.

21. A method of increasing destructive interference in at least a portion of the frequency range from about 1 GHz to about 20 GHz, the method comprising:
   providing the blended composition of claim 11; and
   receiving, at the blended composition, incident electromagnetic radiation in at least a portion of the frequency range from about 1 GHz to about 20 GHz, wherein a reflective wave of electromagnetic radiation is generated in response to receiving the incident electromagnetic radiation, and wherein the reflective wave facilitates destructive interference of incoming electromagnetic radiation.

22. A blended composition for destructive interference in at least a portion of the frequency range from about 1 GHz to about 20 GHz, the blended composition comprising:
   a dielectric; and
   a conductive filler blended with at least a portion of the dielectric via extrusion, wherein the percentage volume of the conductive filler relative to the total volume of the blended composition is configured such that a reflective wave of electromagnetic radiation is generated in response to receiving an incident wave of electromagnetic radiation, the reflective wave having a wavelength on the order of a wavelength of the incident wave of electromagnetic radiation.

23. The composition of claim 22, wherein the thickness of the composition measured from an incident surface is on the order of a wavelength of sensitivity of the composition in at least a portion of the frequency range from about 1 GHz to about 20 GHz.

24. The composition of claim 22, wherein the thickness of the composition measured from an incident surface is a fraction of the wavelength of sensitivity of the composition in at least a portion of the frequency range from about 1 GHz to about 20 GHz.

25. The composition of claim 22, wherein the thickness of the composition measured from an incident surface is about half of the wavelength of sensitivity of the composition in at least a portion of the frequency range from about 1 GHz to about 20 GHz.

* * * * *